United States Patent
Kwon

(10) Patent No.: US 7,325,818 B1
(45) Date of Patent: Feb. 5, 2008

(54) REAR WHEEL TOE ANGLE CONTROL SYSTEM OF VEHICLE

(75) Inventor: Byung Soo Kwon, Yongin-si (KR)

(73) Assignee: Mando Corporation, Seoul (KR)

( * ) Notice: Subject to any disclaimer, the term of this patent is extended or adjusted under 35 U.S.C. 154(b) by 0 days.

(21) Appl. No.: 11/678,083

(22) Filed: Feb. 23, 2007

(30) Foreign Application Priority Data

Sep. 12, 2006  (KR) ..................... 10-2006-0087860

(51) Int. Cl.
*B60G 7/02* (2006.01)

(52) U.S. Cl. .............................. 280/86.758; 280/86.75; 280/86.751

(58) Field of Classification Search ............ 280/86.75, 280/86.751, 86.757, 86.758, 5.52, 5.521, 280/5.522
See application file for complete search history.

(56) References Cited

U.S. PATENT DOCUMENTS

| | | | |
|---|---|---|---|
| 3,756,188 A * | 9/1973 | Smith | ........................ 440/60 |
| 5,026,081 A | 6/1991 | Bauer | |
| 5,292,149 A * | 3/1994 | Luger | ..................... 280/5.521 |
| 5,549,319 A | 8/1996 | Kring et al. | |
| 6,293,561 B1 * | 9/2001 | Goetzen et al. | ........... 280/5.52 |
| 6,402,168 B1 | 6/2002 | Chino et al. | |
| 6,962,355 B2 * | 11/2005 | Kwon | ..................... 280/86.75 |
| 6,962,356 B2 * | 11/2005 | Kwon | ..................... 280/86.75 |
| 2002/0121758 A1 | 9/2002 | Davis et al. | |

FOREIGN PATENT DOCUMENTS

| | | |
|---|---|---|
| EP | 1 088 745 A2 | 4/2001 |
| JP | 62-018309 | 1/1987 |
| JP | 10-218008 | 8/1998 |

* cited by examiner

*Primary Examiner*—Eric Culbreth
*Assistant Examiner*—Joseph Rocca
(74) *Attorney, Agent, or Firm*—Townsend and Townsend and Crew LLP

(57) ABSTRACT

A rear wheel toe angle control system is used as an actuator for controlling rear wheels of a vehicle. The control system is an electric-powered for rapid operation thereof, thereby providing handling stability. The left and right rear wheels are operated by the single actuator to reduce weight and manufacturing costs of a vehicle, and toe angles of the left and right rear wheels are identically controlled to improve handling stability of a vehicle.

7 Claims, 2 Drawing Sheets

REAR WHEEL TOE ANGLE CONTROL SYSTEM OF VEHICLE

BACKGROUND OF THE INVENTION

The present invention relates to a vehicle dynamic control system for improving the handling stability of the vehicle and reducing the size and weight of the system, and more particularly, to a rear wheel toe angle control system in which both rear wheels with toe angles are operated by a single reduction gear, whereby the change in the toe angles of both the rear wheels are synchronized.

In general, a suspension is installed on a vehicle between the body and the wheel and connects the two rigid bodies to each other using one or more links. The suspension includes a trailing arm, a knuckle, a control arm and the like.

The suspension effectively absorbs irregularities on a road surface encountered during driving, thereby providing ride comfort. Also, the suspension appropriately controls the roll of the vehicle body caused by the driver's steering or unevenness of the road surface, thereby giving better control to the driver. In addition, the suspension keeps the tire in contact with the road at a suitable level when the vehicle runs on an irregular road, thereby ensuring handling stability of the vehicle when the vehicle turns or brakes.

Meanwhile, when a vehicle turns, it may oversteer or understeer due to vehicle velocity or lack of friction with the road surface, thereby deteriorating the handling stability of the vehicle. In order to solve this problem, the Korean Patent No. 511742 (Aug. 25, 2005) issued to the present applicant discloses a rear wheel toe angle control system (AGCS: Active Geometry Controlled System) for improving dynamic control and handling stability of a vehicle by controlling the length of a rear control arm and therefore the rear wheel toe angles when a vehicle turns.

FIG. 1 is a view showing a rear wheel toe angle control system of a vehicle according to a prior art. Referring to FIG. 1, a rear wheel toe angle control system 20 includes a pair of actuators 22, 23 respectively installed to the left and right ends of a rear cross member 12. It also includes links 26, 27 for connecting the actuators 22, 23 to the left and right rear wheels 14, 15 and changing the toe angles of the left and right rear wheels 14, 15 by means of rods 24, 25 installed to the actuators 22, 23.

The actuators 22, 23 are hydraulic actuators. As the rods 24, 25 of the actuators 22, 23 are translated, the links 26, 27 control the toe angles of the left and right rear wheels 14, 15.

The conventional rear wheel toe angle control system 20 of a vehicle so configured operates the actuators 22, 23 when the vehicle turns to prevent the vehicle from oversteering or understeering. Meanwhile, the applicant has recently developed a vehicle rear wheel toe angle control system to rapidly control the toe angles of the rear wheels 14, by using an electric-powered actuator in order to improve the slow response of a hydraulic actuator.

In the electric-powered actuator, an upper portion of the housing is mounted with a hall type limit sensor, which includes a hall element and a permanent magnet to stably control the position of the rod. A guide made of non-magnetic material is installed around the permanent magnet to improve the sensing ability of the hall element by concentrating the magnetic flux of the permanent magnet. The electric-powered actuator is configured so that the sliding guide is coupled to the inner surface of the housing to guide the linear movement of the rod.

The aforementioned rear wheel toe angle control system of a vehicle, in which the actuators are mounted on the left and right portions of a rear wheel cross member, controls the toe angle of the outer wheel of a turning vehicle in order to prevent an oversteering or understeering phenomenon by increasing or decreasing the friction force between the tire and a road surface.

However, the conventional rear wheel toe angle control system 20 of a vehicle is provided with the two actuators 22, 23 for controlling the left and right rear wheels 14 and 15. Accordingly, there is a limit in installing the actuators 22, 23 due to a narrow installation space, and the two actuators 22, 23 increase weight and manufacturing costs of a vehicle. In addition, with the two actuators 22, 23 used in the prior art, the toe angles of the left and right rear wheels 14, 15 are controlled independently, which may result in unstable control of the vehicle.

SUMMARY OF THE INVENTION

An embodiment of the present invention is to provide a rear wheel toe angle control system for a vehicle in which the actuator for controlling the rear wheels is electrically-powered for rapid operation, thereby ensuring stability and handling. The left and right rear wheels are also operated by a single actuator to reduce weight and manufacturing costs of the vehicle, and the toe angles of the left and right rear wheels are linked together to improve handling and stability of the vehicle.

According to an aspect of the present invention, there is provided a rear wheel toe angle control system of a vehicle, comprising left and right rear wheels supported by a cross member of a vehicle; left and right link members, each link member having an end connected to the left and right rear wheels; a rack bar having both ends respectively connected to the left and right link members; a case installed to the cross member for receiving the rack bar; and an actuator installed to the rack bar to cooperate therewith, the actuator moving the rack bar so that the left and right link members change toe angles of the left and right rear wheels at substantially the same time. The actuator includes a driving motor installed in a housing; a ring gear to be rotated by the driving motor; a first pinion gear meshed with the ring gear; and a second pinion gear installed to a rotary shaft of the first pinion gear and meshed with the rack bar.

The rear wheel toe angle control system of a vehicle may further comprise a limit switch installed in the case to detect a moving line of the rack bar, the limit switch controlling the operation of the actuator when a detected end of the rack bar is located to an initial position or an excessively-moved position. In addition, the rear wheel toe angle control system of a vehicle may further comprising a magnetic ring installed to the rotary shaft of the first and second pinion gears; and a magnetic sensor installed to the housing surrounding the ring gear to detect a magnetic force of the magnetic ring, wherein a linear displacement of the rack bar is measured by converting a rotation amount of the magnetic ring with a reduction ratio according to a gear ratio of the first gear and the ring gear and a pitch ratio of racks of the rack bar to the second pinion gear.

DETAILED DESCRIPTION OF THE PREFERRED EMBODIMENT

An embodiment of the present invention will be described in detail with reference to the accompanying drawings.

Figure 1:
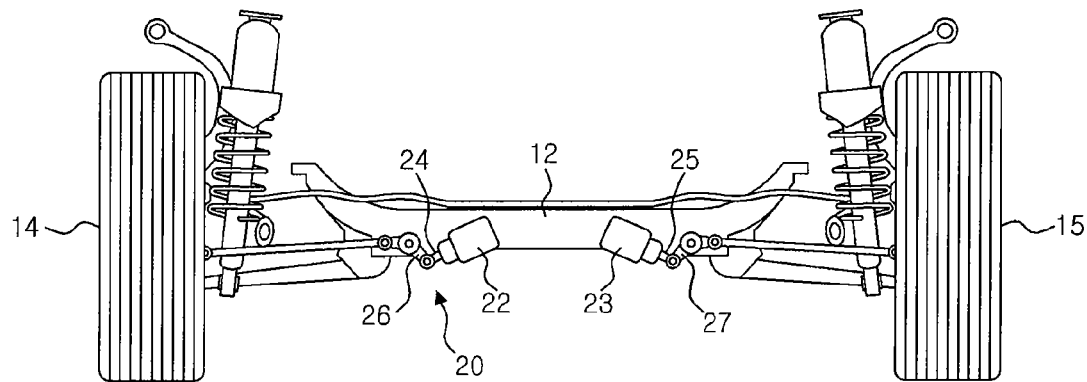
FIG. 1 is a view showing a rear wheel toe angle control system of a vehicle according to a prior art.
Figure 2:
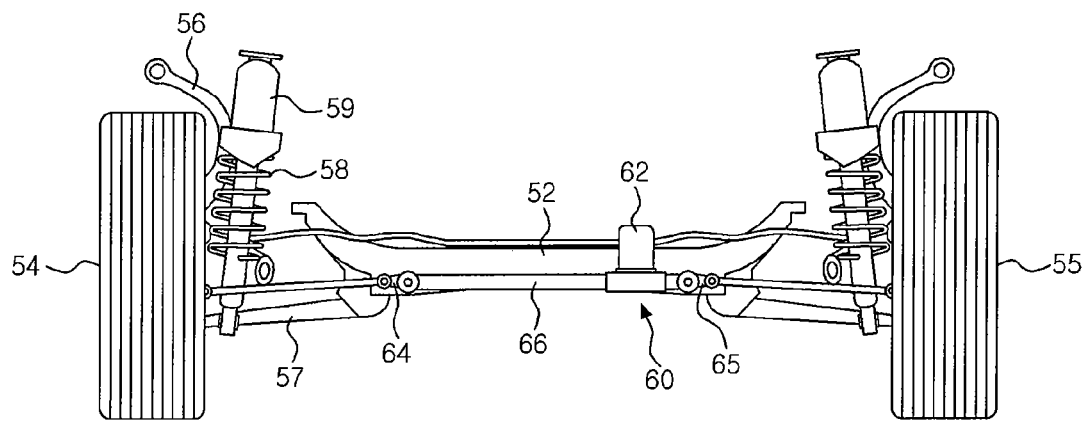
FIG. 2 is a view showing a rear wheel toe angle control system of a vehicle according to the present invention.
Figure 3:
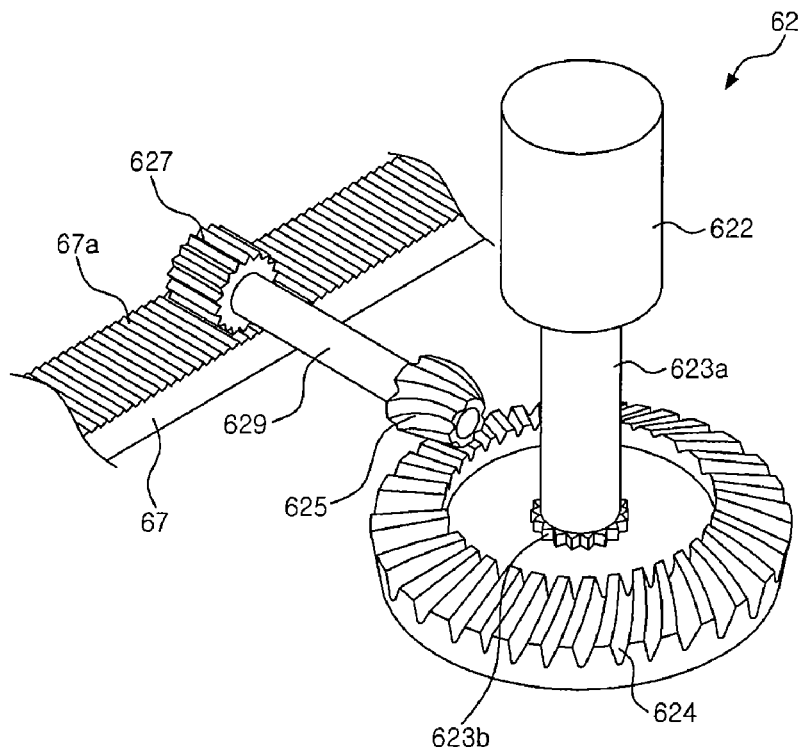
FIG. 3 is a perspective view schematically showing the rear wheel toe angle control system of a vehicle according to the present invention.
Figure 4:
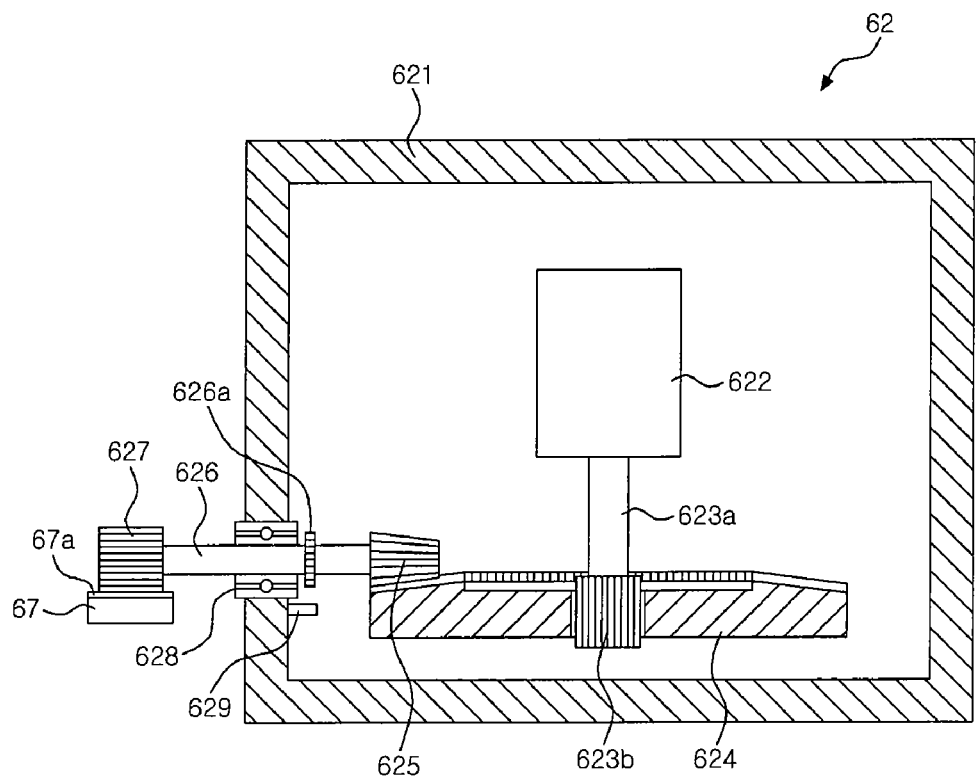
FIG. 4 is a sectional view showing a major portion of the rear wheel toe angle control system of a vehicle according to the present invention.

Referring to FIGS. 2 to 4, the left and right rear wheels 54, 55 of a vehicle are suspended by a rear cross member 52. At this time, the rear wheels 54, 55 are coupled to knuckles 56, which are supported by control arms 57 in a lateral direction and supported by trailing arms (not shown) in a longitudinal direction of the vehicle. In addition, each of the knuckles 56 is supported by a spring 58 and a shock absorber 59 in a vertical direction.

Meanwhile, a rear wheel toe angle control system 60 is installed to the left and right rear wheels 54, 55 to change the toe angles of the rear wheels 54, 55 when the vehicle turns.

The rear wheel toe angle control system 60 includes a case 66 installed in parallel with the cross member 52 and a rack bar 67 housed in the case 66. The rack bar 67 is allowed to move in the case 66, and a plurality of rack teeth 67a are formed on the surface of the rack bar 67.

In addition, a pair of link members 64, 65 respectively connected to the left and right rear wheels 54, 55 are connected to both ends of the rack bar 67. The link members 64, 65 are movable, and each of them may be composed of one or more members and its rotation center may be fixed to a side of the cross member 52.

Meanwhile, the link members 64, 65 control the toe angles of the left and right rear wheels 54, 55 by the translation of the rack bar 67. To this end, an actuator 62 is installed in order to translate the rack bar 67.

Accordingly, as the actuator 62 operates, the rack bar 67 moves the link members 64, 65, whereby the toe angles of the left and right rear wheels 54, 55 are changed at substantially the same time. That is, when the vehicle turns, one of the rear wheels 54, 55 is toed in and the other is toed out according to the turning direction, thereby controlling the stability of the turning vehicle.

The actuator 62 includes a housing 621, and a driving motor 622 installed in the housing 621. In addition, a gear unit 623b having a predetermined length is formed on the end of a rotary shaft 623a of the driving motor 622, and a ring gear 624 is coupled to the gear unit 623b. Further, a first pinion gear 625 is meshed with the gear teeth of the ring gear 624. At this time, the ring gear 624 and the first pinion gear 625 have helical gear teeth, which conform to standards. Furthermore, a second pinion gear 627 is coupled to an end of a rotary shaft 626 of the first pinion gear 625. The second pinion gear 627 is meshed with the rack teeth 67a of the rack bar 67. Here, the rotary shaft 626 of the first and second pinion gears 625, 627 are supported by bearings 628 installed in the housing 621. In addition, the driving motor 622 is an electric-powered motor, preferably a DC motor. In this embodiment, the driving motor 622 is operated at an input DC voltage of 10 to 16V with a rated input voltage of 13.5V.

Meanwhile, in the case 66, there is provided a limit switch for limiting the stroke range of the rack bar 67. The limit switch is installed in the case 66 to detect the moving line of the rack bar 67.

In addition, the limit switch detects an end of the rack bar 67 and then sets a reference position of the rack bar 67 when the rack bar 67 is placed at its initial position. Also, if the end of the rack bar 67 is moved excessively, the limit switch stops the operation of the actuator 62.

According to the rear wheel toe angle control system 60 of a vehicle configured as described above, the single actuator 62 causes the left and right rear wheels 54, 55 to be changed together, thereby improving the reliability of the stability control. In addition, since the initial reference position and the excessively-moved position are detected by the limit switch, the reliability of stability control and thus the handling stability are further improved.

In addition, a magnetic ring 626a is installed on the rotary shaft 626 of the first and second pinion gears 625 and 627, and a magnetic sensor 629 is installed in the housing 621 surrounding the ring gear 624 to detect the magnetic force of the magnetic ring 626a. Thus, the linear displacement of the rack bar 67 may be measured from the rotation of the magnetic ring 626a, the gear ratio between the first pinion gear 625 and the ring gear 624, and the pitch ratio of rack teeth 67a of the rack bar 67 to the second pinion gear 627.

In addition, magnetic rings 626a are installed to the rotary shaft 626 of the first and second pinion gears 625, 627 in order to measure the rotation of the driving motor 622. Also, a magnetic sensor 629 for detecting the magnetic force of the magnetic ring 626a is installed in the housing 621 surrounding the ring gear 624 and to be at a position adjacent to the magnetic ring 626a. In addition, a magnetic signal detected from the magnetic sensor 629 is sent to a central processing unit of the vehicle, and the central processing unit may calculate the rotation of the rotary shaft 623a caused by the driving motor 622.

Meanwhile, the linear displacement of the rack bar 67 may be measured by measuring the rotation of the magnetic ring 626a and then converting the angular rotation with the reduction ratio calculated from the gear ratio between the first pinion gear 625 and the ring gear 624 and the pitch ratio of the rack teeth 67a of the rack bar 67 to the second pinion gear 627. In addition, the toe angles of the left and right rear wheels 54, 55 are controlled according to the measured linear displacement of the rack bar 67.

The operation of the rear wheel toe angle control system of a vehicle so configured will be described as follows.

When a vehicle runs (e.g., turns), it may understeer or oversteer due to the mass of the vehicle body and/or friction with the road surface. At this time, the actuator 62 of the rear wheel toe angle control system 60 is operated to prevent the vehicle from understeering or oversteering. More specifically, if power is supplied to the driving motor 622 of the actuator 62, the driving motor 622 rotates and transmits the rotating force to the ring gear 624. In addition, the rotation of the ring gear 624 rotates the first pinion gear 625 meshed with the ring gear 624, so that the second pinion gear 627 connected to the first pinion gear 625 via the rotary shaft 626 is rotated. The second pinion gear 627 is meshed with the teeth of the rack bar 67, thereby moving the rack bar 67. At this time, the output of the actuator 62 can be controlled according to a reduction ratio of the ring gear 624 and the first and second pinion gears 625, 627. As mentioned above, the rack bar 67 is moved in either the right or left direction by means of the actuator 62, thus moving the link members 64, 65 connected to the left and right rear wheels 54, 55. Accordingly, the link members 64, 65 controls the toe angles of the left and right rear wheels 54, 55 at substantially the same time, and causes one to be toed in and the other to be toed out, thereby preventing the vehicle from understeering or oversteering.

That is, the rear wheel toe angle control system 60 controls the instability of the vehicle caused by the toe-out of the suspension generated when the vehicle turns by controlling the outer wheel to be toed in and the inner wheel to be toed out by means of the actuator 62, thereby ensuring the stability control and therefore the handling stability of the vehicle through the frictional force between the tire and the road surface.

At this time, the toe angles of the rear wheels 54, 55 may be controlled according to the linear displacement of the rack bar 67. To this end, the magnetic sensor 629 measures the magnetic force of the magnetic ring installed on the rotary shaft 626 of the first and second pinion gears 625, 627, thus determining the rotation of the driving motor 622 by measuring the rotation of the magnetic ring 626a. Then, the linear displacement of the rack bar 67 may be measured by converting the rotation amount of the driving motor with a reduction ratio according to the gear ratio between the first pinion gear 625 and the ring gear 624 and the pitch ratio of the racks of the rack bar to the second pinion gear 627.

Meanwhile, an initial start position of the rack bar 67 is set by the limit switch, so that the stroke range of the rack bar 67 is accurately controlled. In addition, the limit switch detects the end of the rack bar 67 and controls the operation of the actuator 62 so that the rack bar 67 is not excessively-moved.

According to the rear wheel toe angle control system of a vehicle of the present invention so configured, the toe angles of the rear wheels are operated by the electric-powered actuator having good response and rapid operation, whereby the handling stability can be improved. In addition, since the left and right rear wheels are operated by the single actuator, the handling stability is further improved by the linked control of the toe angles. Moreover, the rear wheel toe angle control system has a small size, thereby ensuring easy installation and reducing the weight and manufacturing costs of the vehicle. In addition, since the actuator is configured to transfer a driving force by means of a combination of a ring gear and a pinion gear, the driving force can be accurately transferred without loss. Moreover, the control system of the present invention can control the output of the actuator by adjusting the reduction ratio between the ring gear and the pinion gear.

As mentioned above, the rear wheel toe angle control system of a vehicle according to the present invention has been illustrated with reference to the accompanying drawings, but the present invention is not limited to the afore-mentioned embodiments and drawings. It will be apparent that those skilled in the art can make various modifications and changes thereto within the scope of the invention defined by the claims.

What is claimed is:

1. A rear wheel toe angle control system of a vehicle, the rear wheel toe angle control system comprising:
    left and right rear wheels supported by a cross member of a vehicle;
    left and right link members, each link member having an end coupled to the left and right rear wheels;
    a rack bar having both ends respectively coupled to the left and right link members;
    a case installed to the cross member to receive the rack bar; and
    an actuator installed to the rack bar to cooperate there-with, the actuator moving the rack bar so that the left and right link members change toe angles of the left and right rear wheels at substantially the same time,
    wherein the actuator includes a driving motor installed in a housing; a ring gear to be rotated by the driving motor; a first pinion gear meshed with the ring gear; and a second pinion gear installed to a rotary shaft of the first pinion gear and meshed with the rack bar.

2. The rear wheel toe angle control system as claimed in claim 1, further comprising a limit switch installed in the case to detect a moving line of the rack bar, the limit switch controlling the operation of the actuator when a detected end of the rack bar is located to a first position a second position.

3. The rear wheel toe angle control system as claimed in claim 2, wherein the first position is an initial position and the second position is an excessively-moved position.

4. The rear wheel toe angle control system as claimed in claim 3, further comprising:
    a magnetic ring installed to the rotary shaft of the first and second pinion gears; and
    a magnetic sensor installed to the housing surrounding the ring gear to detect a magnetic force of the magnetic ring,
    wherein a linear displacement of the rack bar is measured by converting a rotation amount of the magnetic ring with a reduction ratio according to a gear ratio of the first gear and the ring gear and a pitch ratio of racks of the rack bar to the second pinion gear.

5. The rear wheel toe angle control system as claimed in claim 2, further comprising:
    a magnetic ring installed to the rotary shaft of the first and second pinion gears; and
    a magnetic sensor installed to the housing surrounding the ring gear to detect a magnetic force of the magnetic ring,
    wherein a linear displacement of the rack bar is measured by converting a rotation amount of the magnetic ring with a reduction ratio according to a gear ratio of the first gear and the ring gear and a pitch ratio of racks of the rack bar to the second pinion gear.

6. The rear wheel toe angle control system as claimed in claim 1, further comprising:
    a magnetic ring installed to the rotary shaft of the first and second pinion gears; and
    a magnetic sensor installed to the housing surrounding the ring gear to detect a magnetic force of the magnetic ring.

7. The rear wheel toe angle control system as claimed in claim 6, wherein a linear displacement of the rack bar is measured by converting a rotation amount of the magnetic ring with a reduction ratio according to a gear ratio of the first gear and the ring gear and a pitch ratio of racks of the rack bar to the second pinion gear.

\* \* \* \* \*